United States Patent [19]
Hera

[11] Patent Number: 4,642,851
[45] Date of Patent: Feb. 17, 1987

[54] CONVEYING ARRANGEMENT FOR CONVEYING TEXTILE CANS

[75] Inventor: Georg Hera, Frauenfeld, Switzerland

[73] Assignee: Maschinenfabrik Rieter AG, Winterthur, Switzerland

[21] Appl. No.: 867,457

[22] Filed: May 28, 1986

[30] Foreign Application Priority Data

Jun. 3, 1985 [CH] Switzerland ............... 2326/85

[51] Int. Cl.⁴ ............... D01H 9/00; B65H 75/16; B65G 65/00
[52] U.S. Cl. ............... 19/159 A; 19/236; 57/90; 57/281; 414/344; 414/398; 414/574
[58] Field of Search ............... 19/157, 159 R, 159 A, 19/160, 236, 242, 243; 57/90, 281; 414/572-574, 344, 395, 398; 242/79, 82, 83

[56] References Cited

U.S. PATENT DOCUMENTS

| | | | |
|---|---|---|---|
| 3,125,782 | 3/1964 | Kaino et al. | 19/159 A |
| 3,199,152 | 8/1965 | Tooka et al. | 19/159 A |
| 3,443,287 | 5/1969 | Hertzsch | 19/159 A |
| 3,716,979 | 2/1973 | Handschuh et al. | 57/281 |
| 3,884,026 | 5/1975 | Yoshizawa et al. | 57/281 |
| 4,012,893 | 3/1977 | Weber | 57/281 |
| 4,033,104 | 7/1977 | Kamp | 19/159 A X |
| 4,059,185 | 11/1977 | Weber | 19/159 A |
| 4,227,848 | 10/1980 | Kriechbaum et al. | 414/574 X |
| 4,469,214 | 9/1984 | Maurer et al. | 57/281 X |
| 4,577,372 | 3/1986 | Roder | 19/159 A |

Primary Examiner—John Petrakes
Attorney, Agent, or Firm—Werner W. Kleeman

[57] ABSTRACT

The arrangement conveys cans which deliver and receive textile material, between machines delivering such material and machines which are substantially of the same type but use such material, along a closed transport or conveying path. The conveying path is of a structure comprising sections which extend parallel to each other including a siphon-shaped stand-by section containing parallel legs. Using such sections there is rendered possible a space-saving arrangement and simultaneously ready accessibility to the different sections of the conveying path and the machines for operating the machines and eliminating faults and malfunctions at the machines and the sections of the conveying path.

15 Claims, 1 Drawing Figure

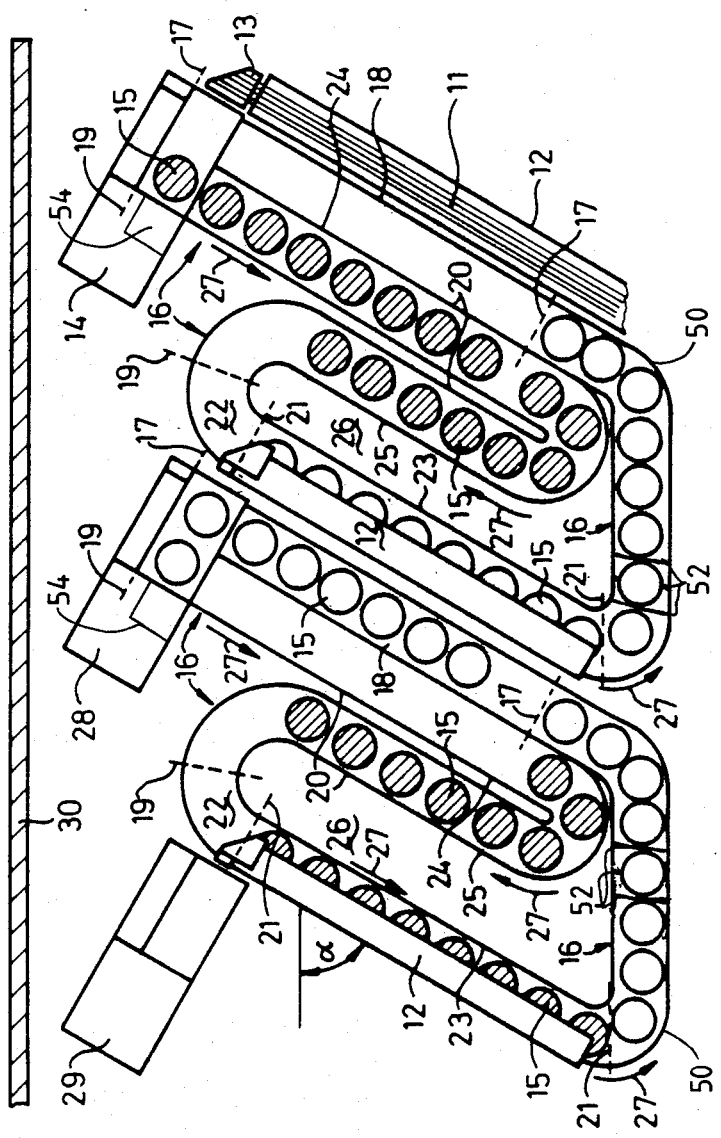

CONVEYING ARRANGEMENT FOR CONVEYING TEXTILE CANS

BACKGROUND OF THE INVENTION

The present invention relates to a new and improved construction of an arrangement for conveying textile cans between a textile material delivering machine and a textile material using machine.

In its more particular aspects, the present invention specifically relates to a new and improved construction of an arrangement for conveying textile cans, especially cans which are filled by a textile material, from a textile machine delivering such textile material to a textile machine of substantially the same type and which uses such textile material, and for conveying empty cans from the last-mentioned textile machine back to the first mentioned textile machine. The cans are moved along a closed transport or conveying path encompassing different sections. These sections comprise a reserve section provided for empty cans and ending at or in close proximity to the textile machine which delivers the textile material.

In an arrangement as known, for example, from Japanese Utility Model No. Sho 50-4813 a plurality of cans serving to receive fiber slivers are circulated on a track forming a closed circulation path. The track has a straight portion such that an empty can and a full can can be mutually exchanged quickly.

Contrary thereto, the present invention relates to a conveying arrangement in which the cans can be exchanged in groups. In particular, there are always present during operation, a predetermined number of cans from which textile material is simultaneously removed and these cans are disposed along an infeed table or creel. The arrangement serves to operationally link textile machines substantially of the same type, that is machines which process, i.e. produce or use substantially the same amount of the textile material within essentially the same time periods.

SUMMARY OF THE INVENTION

Therefore, with the foregoing in mind it is a primary object of the present invention to provide a new and improved construction of an arrangement for conveying textile cans and which is not afflicted with the drawbacks and limitations of the prior art constructions heretofore discussed.

Another and more specific object of the present invention is directed to the provision of a new and improved construction of a conveying arrangement for textile cans and which provides ready accessibility to the cans and to the associated textile machines for the purpose of operating such textile machines and for eliminating faults and malfunctions.

Still a further significant object of the present invention is directed to a new and improved construction of an arrangement for conveying textile cans and which renders possible close mutual positioning of the textile machines, particularly optimum use of the space available in a machine room in which the textile machines are installed.

Now in order to implement these and still further objects of the invention, which will become more readily apparent as the description proceeds, the arrangement of the present development is manifested by the features that, a predetermined number of series-arranged cans are located at the textile machine which uses the textile material, and simultaneously deliver the textile material to such textile machine. The predetermined number of cans are located along a feed section of a closed transport or conveying path. Such transport or conveying path further comprises a syphon-shaped stand-by section which contains two substantially parallel legs. One of the two parallel legs leads away from the textile machine which delivers the textile material, and the other one of the two legs leads to the aforementioned feed section through a free section which is free or devoid of stationary cans. A reserve section as well as the stand-by section are dimensioned such as to accommodate a number of series-arranged cans and which number is at least equal to the aforementioned predetermined number of cans. The reserve section, the legs of the stand-by section and the feed section extend substantially parallel to each other and an intermediate space is present between the other leg of the two parallel legs of the stand-by section and the feed section.

The inventive structure provides optimum service and maintenance conditions and requires minimum space. Such structure is particularly suitable for use with cards, drawframes and sliver lap machines. In such arrangement the drawframes and cards may constitute the textile machines which deliver the textile material, and the drawframes and the sliver lap machines may constitute the textile machines which use the textile material.

BRIEF DESCRIPTION OF THE DRAWING

The invention will be better understood and objects other than those set forth above will become apparent when consideration is given to the following detailed description thereof. Such description makes reference to the annexed single drawing which shows a schematic top plan view of an exemplary embodiment of the inventive arrangement for conveying textile cans.

DETAILED DESCRIPTION OF THE PREFERRED EMBODIMENTS

Describing now the drawings, it is to be understood that only enough of the structure of the arrangement has been shown as needed for those skilled in the art to readily understand the underlying principles and concepts of the present development, while simplifying the showing of the drawing. Turning attention now specifically to the single drawing, the arrangement schematically shown therein by way of example and not by way of limitation, will be seen to contain, as an operational linkage of textile machines, for instance two drawframes and one sliver lap machine. It is to be understood, however, that any other appropriate combinations of such textile machines and also including other textile machines substantially of the same type like, for example, cards can be operationally linked in the inventive arrangement. The operationally linked textile machines constituting textile machines substantially of the same type process substantially the same amounts of textile material within essentially the same time periods, for example, produce or deliver and use substantially the same amounts of textile material during essentially the same time periods.

In the illustrated exemplary embodiment textile slivers 11, delivered in conventional manner by non-illustrated cards, are deposited upon an infeed table 12 forming part of a drawframe 14 and are guided at deflecting or diverting members 13 to the drawframe 14. The textile sliver delivered from the latter is filled into a can 15 available at the filling station or coiler of the drawframe 14. A plurality of cans 15 are located on a closed transport or conveying path 16. The cans 15 are transported along the transport or conveying path 16 in the direction indicated by the arrows 27. The cans 15 which are filled by the textile material, in the present case slivers, are indicated by hatching; the cans 15 not marked by hatching are empty.

The transport or conveying path 16 encompasses a predetermined number of different sections. A reserve section 18 extends between the lines 17, 17. A siphon-shaped stand-by section 20 is present between the lines 19, 19. Furthermore, a free section 22 which is free of stationary cans 15, is provided between the line 19 which constitutes a front or forward line and a rear line 21, each as viewed in the conveying direction indicated by the arrow 27. However, the cans 15 can be moved through the free section 22. Furthermore, a feed section 23 is located between the lines 21, 21. The siphon-shaped stand-by section 20 has two legs 24 and 25 which extend immediately adjacent each other. One leg 24 leads away from the drawframe 14. An intermediate space 26 is present between the second leg 25 and the feed section 23. The free section 22 which is free or devoid of stationary cans 15, and the intermediate space 26 permit ready access to the feed section 23 and the drawframe 28 for the operating personnel to eliminate any possible arising faults and malfunctions. The reserve section 18, the legs 24 and 25 of the stand-by section 20 and the feed section 23 are disposed substantially parallel to each other.

During operation, a predetermined number of cans 15 is always located in the feed section 23. In the illustrated example, the predetermined number of cans 15 amounts to eight such cans 15 but, depending on the momentary requirements and conditions, the predetermined number of cans 15 may amount to any other appropriate number different from eight. These cans 15 simultaneously deliver textile material in the form of slivers which are removed from the cans 15 and deposited adjacent each other on a further infeed table 12 which is associated with a further textile machine 28. In the illustrated example, the further textile machine 28 also constitutes a drawframe. However, instead of the drawframe the further textile machine 28 may constitute any other textile machine which is substantially of the same type as the drawframe 14, i.e. a textile machine which processes substantially the same amount of textile material within essentially the same period of time as compared to the drawframe 14. From the associated further infeed table 12 the slivers are fed to the further drawframe 28 and are drawn therein to form a further sliver. The further drawframe 28 operates as a textile material using machine or consumer with respect to the textile material delivering machine operatively associated therewith, namely the drawframe 14 in the transport or conveying arrangement described hereinbefore and illustrated in the right-hand portion of the single drawing.

The sliver delivered by the further drawframe 28 is again filled into cans 15. The transport of these cans 15 is carried out in the same manner as previously described. The related transport or conveying arrangement used for this purpose is illustrated in the left-hand portion of the single drawing and is substantially identical with the transport or conveying arrangement described hereinbefore with reference to the right-hand portion of this drawing. Therefore, the same reference numerals are generally conveniently used for designating the same elements in the left-hand and right-hand transport or conveying arrangements.

From the further drawframe 28, the cans 15 pass via the closed transport or conveying path 16 shown on the left in the drawing, to a still further infeed table 12 associated with a sliver lap machine 29. When viewing the arrangement on the left in the drawing, the further drawframe 28 constitutes a textile material delivering machine and the sliver lap machine 29 constitutes a textile material using machine. Instead of the sliver lap machine 29 the illustrated embodiment may contain any other appropriately selected textile material using machine substantially of the same type, i.e. a textile machine which processes substantially the same amount of sliver or textile material within essentially the same period of time. The slivers are removed from the cans 15 on the further feed section 23 shown on the left in the drawing, are deposited upon the still further infeed table 12 and pass therefrom to the sliver lap machine 29. The slivers are processed in the sliver lap machine 29 so as to form a lap.

When, during operation of the illustrated transport or conveying arrangement, the cans 15 located in one of the feed sections 23 are empty, such cans 15 must be replaced by filled cans 15. This replacement operation will be considered first with reference to the arrangement shown in the right-hand portion of the drawing. As a first step, the empty cans 15 are removed from the lower section of the transport or conveying path 16 and this lower section extends essentially horizontally as shown in the drawing. The eight empty cans 15 are displaced in the transport or conveying direction indicated by the arrow 27 into the reserve section 18. Thereafter, the eight empty cans 15 located in the feed section 23 are moved into the lower or horizontal section in the direction indicated by the arrow 27. Thereupon, the filled cans 15 in the stand-by section 20 are further displaced in such a manner that eight filled cans 15 are introduced into the feed section 23. During the course of this operation, the free section 22 is maintained free of stationary cans 15. Any excess filled cans 15 thus remain behind the front line 19 as viewed in the direction of the arrow 27.

The arrangement illustrated in the left-hand portion of the drawing shows the condition immediately after the aforementioned displacement of the cans 15. The infeed of textile material or sliver into the empty cans 15 at the filling station of the further drawframe 28 normally is carried out without interruption so that, during further displacement of the filled cans 15 into the stand-by section 20, the first one of the empty cans 15 which previously have been newly introduced into the reserve or waiting section 18, is instantaneously moved into this filling station of the further drawframe 28. After eight filled cans 15 have been brought into the feed section 23 of the sliver lap machine 29, the removal of the textile material or sliver from these filled cans 15 can be resumed.

It is evident from the drawing that the free section 22 together with the intermediate space 26 forms a maintenance area which is readily accessible for the operating personnel. During practical operation, attendance or supervisory operations are only very rarely necessary in the reserve sections 18 and the stand-by sections 20. Such attendance operations are required more frequently at the textile machines 14, 28, 29. Faulty operations and the need for attendance or maintenance occurs most often in the feed sections 23 and at the infeed tables 12. In particular, piecing of the slivers from the new filled cans 15 must be carried out in this region after each can change operation. In the presence of, for example, a sliver break or rupture, such break or rupture will become apparent during the operation of removing the sliver from the can 15. The convenient accessibility of the free sections 22 and the intermediate spaces 26 thus prove to constitute an especially valuable and useful feature.

The inventive arrangement shown in the drawing permits the provision of a certain reserve of cans 15. These reserve cans constitute a buffer or buffer condition permitting that emptying of the filled cans 15 in each feed section 23 does not have to exactly coincide with filling of the empty cans 15 in the related stand-by section 20; there is thus provided a degree of flexibility or latitude in this respect.

The minimum number of cans 15 present on the transport or conveying path 16 is equal to twice the predetermined number of cans 15 intended for the related feed section 23. In the illustrated example, this minimum number amounts to two times eight, i.e. sixteen cans 15. This number results because upon removal of the eight empty cans 15 from the feed section 23, eight filled cans 15 must be moved up from the stand-by section 20. During the time period the filled cans 15 deliver textile material or sliver, the cans 15 previously removed from the feed section 23 and moved immediately into the reserve section 18 are filled again in succession.

The maximum number of cans 15 is present in the transport or conveying arrangement when the transport or conveying path 16 is fully occupied with cans 15 except for the free section 22 and a predetermined number of can-free locations and which number is equal to the predetermined number of cans, namely eight. The eight can-free locations are required for the cans 15 which leave the textile material delivering machine 19 or 28 between two transport or conveying movements.

In a special embodiment of the invention, the reserve sections 18 are each constructed as a section which descends toward the related textile material delivering machine 14 or 18. Each leg 24 of the operatively associated stand-by section 20 is constructed as a descending section in a direction away from such textile machines. When in such embodiment, the cans 15 can be rolled on wheels, then, the movement of the cans 15 to and from each of the textile material delivering machines or drawframes 14 and 28 is facilitated. If wheels are mounted at the cans 15, there are preferably provided guide means or guides, generally indicated by reference character 50, which extend along the complete transport or conveying path 16. The wheels at the cans 15 and the guide means or guides conjointly constitute conveying means for conveying the cans 15 along the closed transport or conveying path 16.

In a further embodiment the floor or bottom of the transport or conveying path 16 can be constructed as a roller conveyor by means of rotatably supported, cylindrical rollers arranged at right angles to the transport or conveying direction as symbolically indicated by reference numeral 52. Such roller conveyor 52 then also constitutes conveying means for conveying the cans 15 along the closed transport or conveying path 16. It is also within the scope of the present invention to move the cans 15 by means of conveying means containing an automatic conveying drive as generally indicated by reference numeral 54. Such automatic conveying drive may be controlled in dependence upon the level of filling of the cans 15 located in the feed section 23.

A spinning room installation of the inventive transport or conveying arrangement requiring minimum space can be obtained in the following manner:

A wall 30 is assumed to constitute one of the side walls of the spinning room. Under these circumstances and if the reserve sections 18, the feed sections 23 and the legs 24 and 25 of the stand-by sections 20 are of linear construction, then these sections 18, 23 and 20 are arranged in the manner as illustrated and at a preselected angle $\alpha$ relative to the side wall 30. The angle $\alpha$ is selected such that, for example, the ends of the feed sections 23 and which ends are remote from the wall 30, all have substantially the same spacing from this side wall 30. Hence, also the textile material processing machines 14, 28, 29 all have substantially the same spacing from this wall 30. An intermediate space which is small at the most, is provided between the reserve sections 18 and the legs 24 of the stand-by sections 20 as well as between the two legs 24 and 25 of the stand-by sections 20.

In the illustrated embodiment, eight cans 15 are provided as the predetermined number of cans 15 on the feed section 23. This predetermined can number, of course, may assume any other appropriate value.

While there are shown and described present preferred embodiments of the invention, it is to be distinctly understood that the invention is not limited thereto, but may be otherwise variously embodied and practiced within the scope of the following claims.

Accordingly, what I claim is:

1. An arrangement for conveying textile cans between a textile material delivering machine and a textile material using machine, comprising:
   a closed conveying path containing a predetermined number of sections;
   said predetermined number of sections encompassing:
   a reserve section operatively associated with said textile material delivering machine and provided for accommodating empty cans;
   a feed section operatively associated with the textile material using machine and accommodating a predetermined number of series-arranged cans filled by textile material;
   a substantially syphon-shaped stand-by section extending intermediate said reserve section and said feed section;
   said stand-by section containing two legs which extend substantially parallel to each other and which are interconnected at one of their ends;
   one of said two legs of said stand-by section leading away from said textile material delivering machine;
   an other one of said two legs of said stand-by section leading to said feed section;
   a free section interconnecting said other leg of said stand-by section and said feed section and remaining free of stationary cans during operation of the arrangement;
   said reserve section and said stand-by section at least accommodating a number of series-arranged cans equal to said predetermined number of cans; and
   said reserve section, said two legs of said stand-by section and said feed section being arranged substantially parallel to each other and with an intermediate space provided between said other leg of said two legs of the stand-by section and said feed section.

2. The arrangement as defined in claim 1, wherein:
said textile material delivering machine and said textile material using machine are substantially of the same type; and
said textile material delivering machine and said textile material using machine being constructed such as to process substantially the same amounts of textile material within essentially the same period of time.

3. The arrangement as defined in claim 1, wherein:
said feed section simultaneously holds said predetermined number of series-arranged cans.

4. The arrangement as defined in claim 1, further including:
a preselectable number of can-free locations in addition to said free section; and
said preselectable number being selected to be substantially equal to said predetermined number of cans.

5. The arrangement as defined in claim 1, wherein:
said closed conveying path is constructed to accommodate a minimum number of cans; and
said minimum number of cans being substantially equal to twice said predetermined number of cans.

6. The arrangement as defined in claim 1, wherein:
said textile material delivering machine is a card.

7. The arrangement as defined in claim 1, wherein:
said textile material delivering machine is a drawframe.

8. The arrangement as defined in claim 1, wherein:
said textile material using machine is a drawframe.

9. The arrangement as defined in claim 1, wherein:
said textile material using machine is a sliver lap machine.

10. The arrangement as defined in claim 1, wherein:
said closed conveying path contains a floor and defines a predetermined conveying direction; and
said conveying means constituting a roller conveyor containing rotatably supported, substantially cylindrical rollers arranged in said floor substantially at right angles to said predetermined conveying direction.

11. The arrangement as defined in claim 1, further including:
conveying means for conveying said textile cans along said closed conveying path;
said conveying means comprise wheeled cans defining said textile cans;
said reserve section descending toward the textile material delivering machine operatively associated therewith; and
said one leg of the stand-by section descending in a direction away from said textile material delivering machine.

12. The arrangement as defined in claim 11, wherein:
said conveying means further contain guide means extending along said closed conveying path; and
said guide means guiding said wheeled cans.

13. The arrangement as defined in claim 1, further including:
conveying means for conveying said cans along said closed conveying path;
said conveying means containing an automatic conveying drive; and
said automatic conveying drive being controllable in dependence upon the filling level of the cans located in said feed section.

14. The arrangement as defined in claim 1, wherein:
said reserve section and said one leg of said stand-by section at most define a small intermediate space between themselves; and
said two legs of said stand-by section at most defining a small intermediate space between themselves.

15. A textile machine installation in a machine room containing a predetermined side wall, comprising:
a sequential arrangement of a predetermined number of textile material delivering machines and a predetermined number of textile material using machines;
said textile material delivering machines and said textile material using machines being arranged at approximately the same spacing from said predetermined wall of said spinning room;
a predetermined number of closed conveying paths each containing a predetermined number of sections;
said predetermined number of sections comprising:
a reserve section operatively associated with a preselected one of said predetermined number of textile material delivering machine and provided for accommodating empty cans;
a feed section operatively associated with a preselected one of said predetermined number of said textile material using machine and accommodating a predetermined number of series-arranged cans filled by textile material;
a substantially syphon-shaped stand-by section extending intermediate said reserve section and said feed section;
said stand-by section containing two legs which extend substantially parallel to each other and which are interconnected at one of their ends;
one of said two legs of said stand-by section leading away from said preselected textile material delivering machine;
an other one of said two legs of said stand-by section leading to said feed section;
a free section interconnecting said other leg of said stand-by section and said feed section and remaining free of stationary cans during operation of the arrangement;
said reserve section and said stand-by section at least accommodating a number of series-arranged cans equal to said predetermined number of cans;
said reserve section, said two legs of said stand-by section and said feed section being arranged substantially parallel to each other and with an intermediate space provided between said other leg of said two legs of the stand-by section and said feed section;
said reserve sections and said feed sections of said predetermined number of closed conveying paths being arranged at a predetermined angle of inclination relative to said predetermined wall of said machine room;
each one of said feed sections containing an end remote from the preselected textile material using machine with which such feed section is operatively associated; and
said remote ends of said feed sections having substantially the same spacing from said predetermined wall of said machine room.

* * * * *